(12) United States Patent
Glaesman et al.

(10) Patent No.: US 12,278,447 B2
(45) Date of Patent: Apr. 15, 2025

(54) SEAL FOR ELECTRICAL AND PRESSURE ISOLATION

(71) Applicant: Halliburton Energy Services, Inc., Houston, TX (US)

(72) Inventors: Chad W. Glaesman, Singapore (SG); Sandeep Thatathil, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 428 days.

(21) Appl. No.: 17/738,387

(22) Filed: May 6, 2022

(65) Prior Publication Data

US 2023/0361502 A1 Nov. 9, 2023

(51) Int. Cl.
*H01R 13/533* (2006.01)
*H01R 13/52* (2006.01)

(52) U.S. Cl.
CPC ..... *H01R 13/5216* (2013.01); *H01R 13/5202* (2013.01); *H01R 13/5221* (2013.01); *H01R 13/533* (2013.01)

(58) Field of Classification Search
None
See application file for complete search history.

(56) References Cited

U.S. PATENT DOCUMENTS

| 7,748,468 | B2 * | 7/2010 | Casciaro | E21B 33/1208 166/387 |
| 7,841,417 | B2 * | 11/2010 | Allison | E21B 33/1208 166/387 |
| 8,051,913 | B2 * | 11/2011 | Huang | E21B 33/10 166/387 |
| 8,499,843 | B2 * | 8/2013 | Patel | E21B 33/1277 166/387 |
| 9,540,900 | B2 * | 1/2017 | Sellers, Jr. | F16L 55/132 |
| 2006/0108803 | A1 | 5/2006 | Reynolds | |
| 2011/0008101 | A1 | 1/2011 | Santi et al. | |
| 2011/0204545 | A1 | 8/2011 | Tanner et al. | |
| 2011/0221137 | A1 | 9/2011 | Obi et al. | |
| 2017/0159403 | A1 | 6/2017 | Tolman et al. | |

OTHER PUBLICATIONS

Halliburton Energy Services, Inc., International Search Report and Written Opinion, PCT/US2022/028062, Feb. 2, 2023, 11 pages.

* cited by examiner

*Primary Examiner* — Tho D Ta
(74) *Attorney, Agent, or Firm* — Kilpatrick Townsend & Stockton LLP

(57) ABSTRACT

A seal for use within a hydrocarbon environment including a core and a shell that is coupled to the core. The core includes an elastomeric core material with a first modulus. The shell includes a shell material with a second modulus that is lesser than the first modulus. The core and the shell can be positioned to generate a pressure and electrical seal at a sealing interface.

19 Claims, 6 Drawing Sheets

SEAL FOR ELECTRICAL AND PRESSURE ISOLATION

TECHNICAL FIELD

The present disclosure relates generally to wellbore operations and, more particularly (although not necessarily exclusively), to wellbore sealing devices and techniques.

BACKGROUND

An apparatus or well tool that is deployable in wellbores can include electronic components that may benefit from electrical isolation at an electrical coupling interface. The electrical coupling interface between two materials in such an apparatus, especially between machined metal surfaces, may result in a fluid flow path that can provide an electrical path. A seal may be positioned at an interface to provide a pressure seal at the electrical coupling interface that prevents pressure leaks while still retaining enough of the well fluids to complete an electrical circuit between sides of the pressure seal.

DETAILED DESCRIPTION

Figure 1:
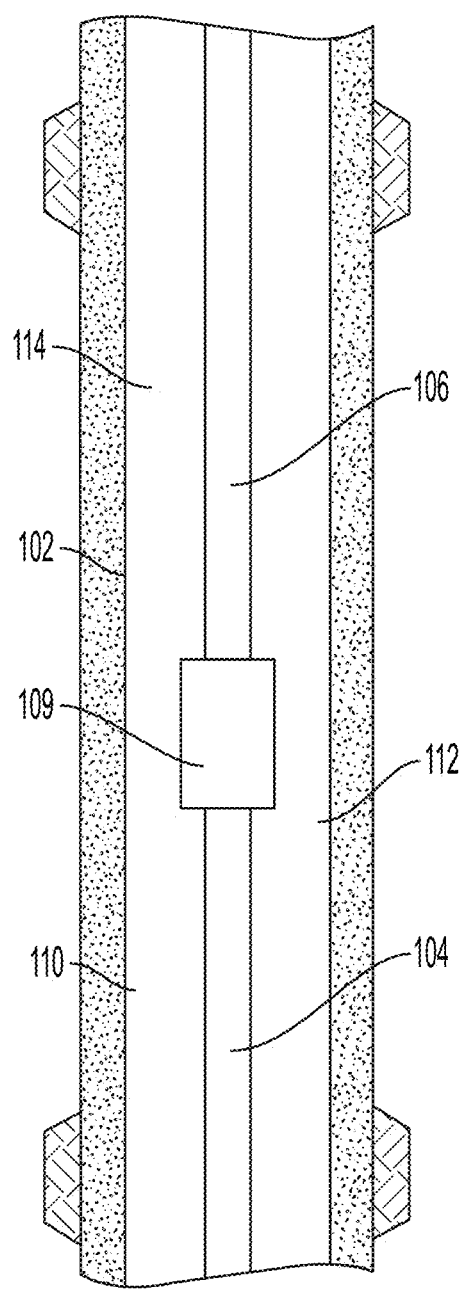
FIG. 1 is a sectional side-view of a wellbore containing a wet-stab connector according to some examples of the present disclosure.

Certain aspects and examples of the present disclosure relate to a seal with an elastomeric core material that has a first modulus and a shell material that has a second modulus that, in combination, may provide electrical isolation and pressure isolation for components that are deployable in a wellbore. A modulus of a substance can refer to an elastic modulus that characterizes a stiffness of a material. For example, a substance with a high modulus may deform less under a compressive force than another substance with a lower modulus. The first modulus of the elastomeric core material may be higher than the second modulus of the shell material. The shell material may partially or completely encapsulate the core material. In some examples a component using the seal within a wellbore may be a stab connector that can be used for transmitting power and data between surface equipment and a downhole tool.

In some examples, a seal with an elastomeric core material that has a first modulus and a shell material with a second modulus that is lower than the first modulus may allow for a high compressive strength, increased electrical insulation, and increased pressure insulation at a sealing interface. The sealing interface may include machined insulator materials such as thermoplastic materials and ceramic materials, which can have a high surface roughness and may include sharp edges or microserrations. The low modulus shell material may be able to conform to the high surface roughness of the sealing interface for preventing fluid continuity paths that can form due to the high surface roughness. The high modulus elastomeric core material may provide the seal with structural reinforcement that may allow it to maintain high contact stresses and a high compressive strength. The elastomeric core material may also include compounds that are resistant to chemical corrosion and rapid gas decompression. The elastomeric core material may also provide additional electrical insulation and pressure insulation by creating a pressure barrier between the inside of the wet-stab connector and an external environment.

In some examples, the shell material may be applied as a shell through a surface modification to the elastomeric core material to improve the electrical insulation and pressure insulation at the sealing interface without modifying bulk properties of the core material. In some examples, the shell material may be a liquid polymer that can be applied to the core material by dipping the core into the shell material, co-extruding the core material with the shell material, or enabling the core material to absorb the shell material. Applying the liquid polymer shell material to the core material may involve blending the liquid polymer with a liquid peroxide that may be the same type of liquid peroxide used in the elastomeric core material. Once blended with the liquid peroxide, the shell material can be co-cured with the elastomeric core material. For applications where the shell is 125 microns or smaller, the liquid polymer can be thinned by solvents until a desired shell thickness is achieved. The liquid polymer may include polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

In another example, the elastomeric core material may be partially cured. The partial curing of the elastomeric core material may be followed by a diffusion-controlled reactive gas or chemical exposure to scavenge any surface peroxides that may not have reacted during the partial curing process. The scavenged surface peroxides may not contribute to cross-linking in the elastomeric core material, thereby creating a shell material with a reduced modulus. In some examples, this can be accomplished by exposing the shell material to an $O_2$-rich post-cure, exposing the shell material to an acidic chemical treatment, or exposing the shell material to a substance with a sulfur-containing or donating chemistry. The shell material may be exposed to the peroxide-scavenging substance via a coating of the peroxide-scavenging substance on a mold for the shell. In an example, the modulus of the shell material may increase gradually from an outer-surface of the seal toward the elastomeric core material. The gradual change in the modulus may generate a modulus gradient of the seal.

In another example, the elastomeric core material may be cured with diffusion limited chemical treatments to form the shell material from a portion of the elastomeric core material. In some examples, the diffusion-limited chemical treatments can promote polymer reversion. The polymer reversion process may decrease a molecular weight of the shell material, thereby decreasing the modulus of the shell material. The shell material may include a halogenated polymer that can exhibit reversion when exposed to zinc-containing compounds. The halogenated polymer can also exhibit a vulcanization sensitivity when exposed to zinc-containing compounds. The vulcanization sensitivity can enable the halogenated polymer to be hardened when treated at high temperatures. Additionally or alternatively, the shell material may include a fluorinated polymer that can de-fluorinate, thereby liberating hydrogen fluoride and leading to cleavage of a backbone of the polymer. Cleavage of the backbone of the polymer may decrease the modulus of the polymer. Alternatively, the shell material may include an unsaturated diene polymer that may exhibit reversion when exposed to persistent high temperatures.

In some examples, the shell material may be 50 microns or less in thickness. The thickness of the shell material may be tuned to match a surface finish of a material at the sealing interface to which the seal is to be applied. In some examples, the shell material may include a low-solubility wax that can bloom to a surface of the shell. In some examples, the shell material may be susceptible to volumetric swelling, such as a water-swellable elastomer. The volumetric swelling may decrease the modulus of the shell material.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a sectional side-view of a well system 100 containing a wet-stab connector 102 that may include an elastomeric seal according to some examples of the present disclosure. The well system 100 includes a wellbore 102. In some examples, the wellbore 102 can be cased and cemented, as shown in FIG. 1. In other examples, the wellbore 102 can be uncased or the casing may not be cemented. The wellbore 102 can include a data or power cable 104, for example, as part of a downhole completion string (not shown). The data or power cable 104 can be positioned in a downhole portion 112 of the wellbore 102 relative to a wet-stab connector 109. In some examples, the cable 104 can be positioned in an annulus 110 between the downhole completion string and a wall of the wellbore 102. The wellbore 102 can further include a tubular string 106, for example, an uphole completion string. The tubular string 106 can be positioned in an uphole portion 114 of the wellbore 102 with respect to the wet-stab 109. The wet-stab connector 109 may provide an electrical and communication connection between the uphole cable 106 and the downhole cable 104. In doing so, the wet-stab connector 109 may form an electrical connection between equipment that can be positioned at a surface of the wellbore 102 and a tool that can be positioned downhole in the wellbore 102, such as a sensor component. The wet-stab connector 109 may include an elastomeric seal for providing pressure isolation and electrical isolation to the electrical connection. The elastomeric seal can include an elastomeric core material with a first modulus and a shell material with a second modulus. In an example, the second modulus may be lower than the first modulus. This multi-modulus arrangement may enable the elastomeric seal to conform to a surface roughness of machined parts of the wet-stab connector 109 to enhance the electrical isolation properties of the elastomeric seal.

Figure 2:
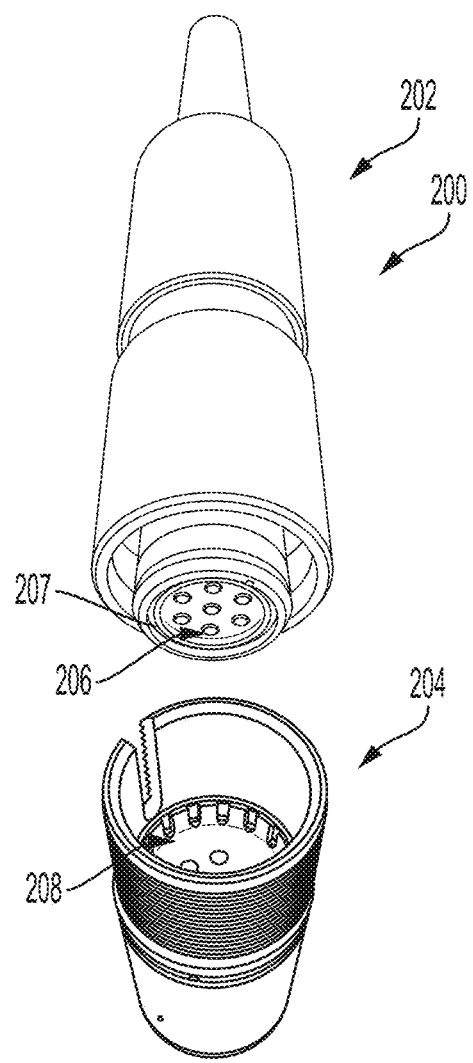
FIG. 2 is an exploded-view diagram of the wet-stab connector of FIG. 1 with an elastomeric seal according to some examples of the present disclosure.

FIG. 2 is an exploded view of a wet-stab connector 200 that can include an elastomeric seal 207 according to some examples of the present disclosure. The wet-stab connector 200 may include a male portion 202 that is capable of receiving a female portion 204. The male portion 202 may include male electrical conductors 206 that can be sized to couple with female electrical conductors 208 of the female portion 204 during a wet-stab coupling. Once coupled, the male electrical conductors 206 and the female electrical conductors 208 may form an electrical connection between the male portion 202 and the female portion 204. The electrical connection can be used for transmitting power or data between surface equipment and a downhole tool or apparatus that may be electrically and communicatively coupled to the wet-stab connector 200.

An elastomeric seal 207 may be positioned on the wet-stab connector for providing a pressure seal and an electrical seal to the electrical connection. For example, the elastomeric seal 207 may be an O-ring that can be positioned around the male conductors 206 for filling in a gap between the male portion 202 and the female portion 204. The elastomeric seal 207 may include an elastomeric core material with a first modulus and a shell material with a second modulus. In some examples, the second modulus may be lower than the first modulus. This multi-modulus arrangement can enable the shell material to conform to a surface roughness of machined parts at a sealing interface formed by the male portion 202 and the female portion 204 to prevent undesired paths for fluid flow or electrical current flow at the sealing interface. Preventing the undesired flow paths at the elastomeric seal 207 can improve pressure and electrical isolation at the sealing interface.

Figure 3:
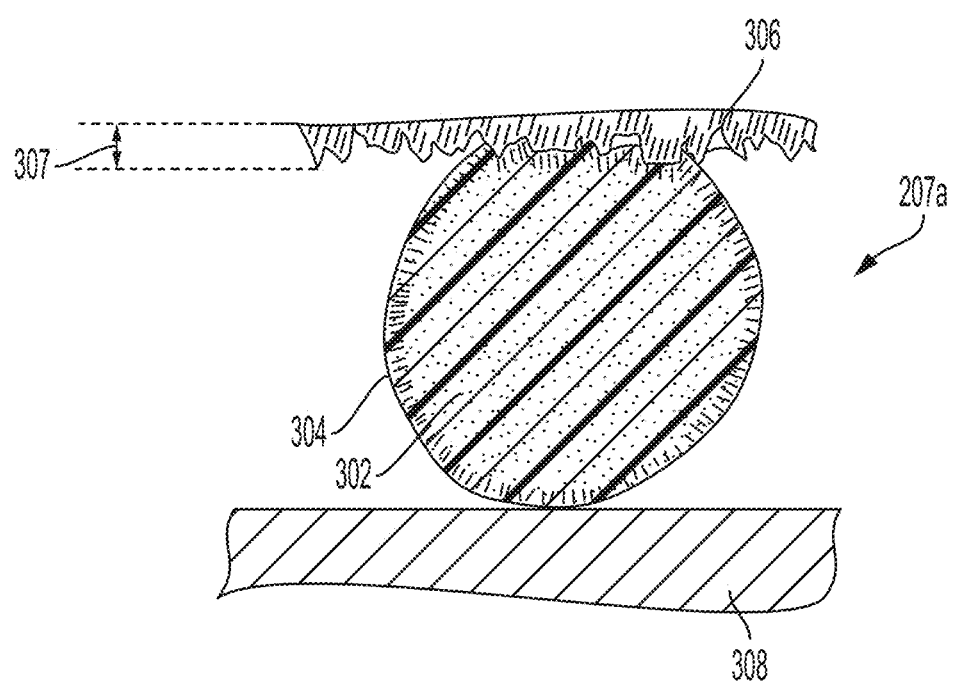
FIG. 3 is a cross-sectional view of the elastomeric seal of FIG. 2 in a sealed position according to some examples of the present disclosure.

FIG. 3 is a cross-sectional view of an elastomeric seal 207a for use in a wellbore environment according to some examples of the present disclosure. The elastomeric seal 207a can include a core 302 and a shell 304, where the core 302 may be encapsulated by the shell 304. The elastomeric seal 207a may be positioned between a surface of a male portion 306 and a surface of a female portion 308 of a wet-stab connector, such as the wet-stab connector 200 of FIG. 2, to form a sealing interface. The surface of the male portion 306, the surface of the female portion 308, or both surfaces may include micro-irregularities such as jagged edges, peaks, valleys, and microserrations. In some examples, the surfaces may be smooth. The surfaces with micro-irregularities may be characterized by a roughness parameter that defines a surface roughness of the surface. One example of a roughness parameter may include a maximum peak-to-valley height 307. Other examples of roughness parameters include average profile height deviation from a mean line, a root mean square average profile height deviation from the mean line, a maximum valley depth below a mean line, a maximum peak height above the mean line, a profile skewness about the mean line, a profile kurtosis, or an average distance between a highest peak and a lowest valley in a sampling length. Other roughness parameters may also be used.

In some examples, the core 302 may include an elastomeric core material with a first modulus, and the shell 304 may include a shell material with a second modulus. The second modulus may be lower than the first modulus to enable the shell material to conform to micro-irregularities at the sealing interface. A thickness of the shell 304 may adjusted based on one or more roughness parameters associated with one of the surfaces (e.g., associated with a roughest surface of the sealing interface). For example, the thickness of the shell 304 may be selected to be approximately equal to the maximum peak-to-valley height 307 of the roughest surface of the seal interface, such as female portion 308 in FIG. 3. Other roughness parameters may also be used in selecting the thickness of the shell 304. Deploying the elastomeric seal 207 at the sealing interface may provide electrical and pressure isolation.

Figure 4:
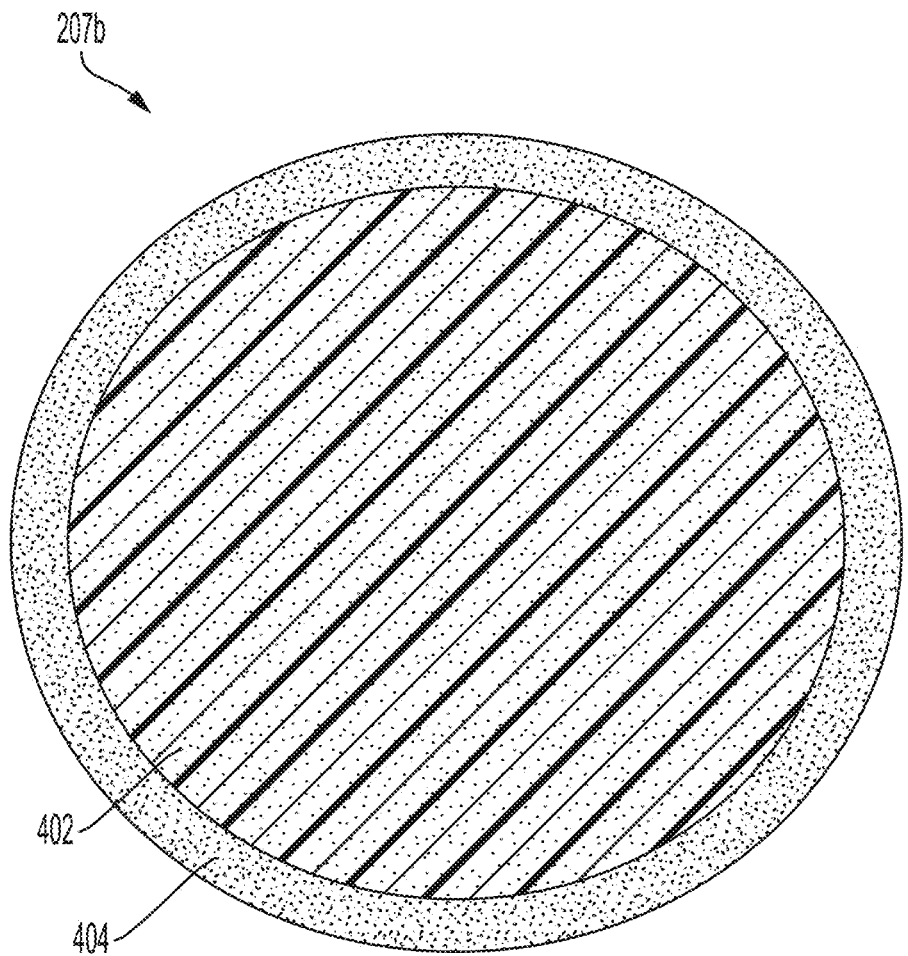
FIG. 4 is a cross-sectional view of an example of the elastomeric seal of FIG. 2 according to some examples of the present disclosure.

FIG. 4 is a cross-sectional view of an elastomeric seal 207b with a co-cured liquid polymer shell 402 for use in a wellbore environment according to some examples of the present disclosure. The elastomeric seal 207b can include a core 402 that may be encapsulated by the shell 404 In some examples, the core 402 may include an elastomeric core material with a first modulus, and the shell 404 may include a shell material with a second modulus. The second modulus may be lower than the first modulus to enable the shell material to conform to a surface roughness of a sealing interface.

In some examples, the shell material may be applied as a shell through a surface modification to the elastomeric core material to improve the electrical isolation and pressure isolation at the sealing interface without modifying bulk properties of the core material. In some examples, the shell material can be applied to the core 402 by dipping the core 402 into the shell material, co-extruding the core material with the shell material, or enabling the core material to absorb the shell material. Applying the liquid polymer shell 404 to the core 402 may involve blending the liquid polymer with a liquid peroxide that may be the same type of liquid peroxide used in the elastomeric core material. Once blended with the liquid peroxide and applied to the core material, the shell material can be co-cured with the elastomeric core material. For applications where the shell is 125 microns or smaller, the liquid polymer can be thinned by solvents until a desired shell thickness is achieved. The liquid polymer may include polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof. In some examples, the shell material may include a low-solubility wax that can bloom to a surface of the shell 404. The low-solubility wax may form the shell 404 or may be included with the shell 404 and may have a lower modulus than the core 402.

Figure 5:
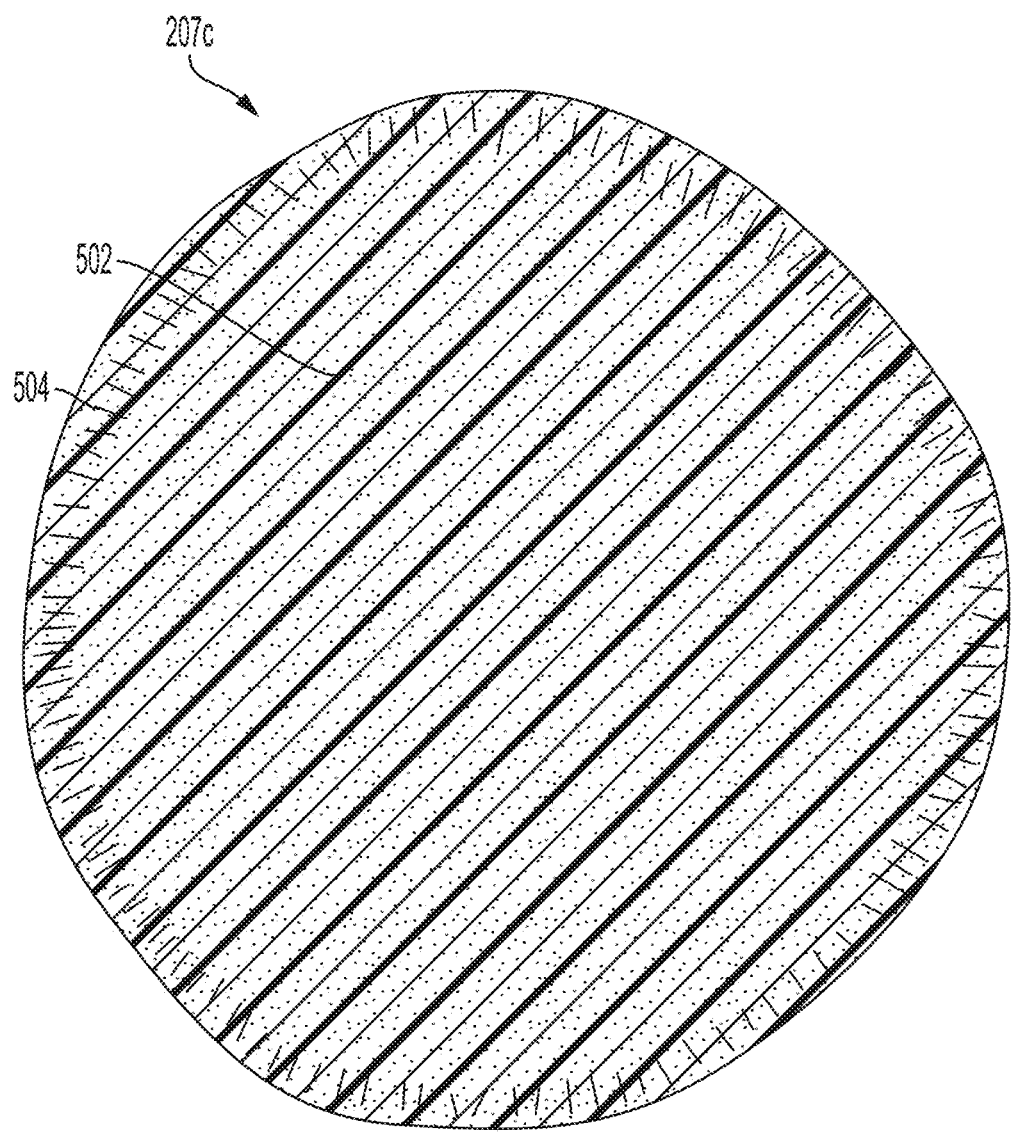
FIG. 5 is a cross-sectional view of an additional example of the elastomeric seal of FIG. 2 according to some examples of the present disclosure.

FIG. 5 is a cross-sectional view of an additional example of an elastomeric seal 207c with a chemically-treated base material to create a lower modulus "shell" 504 for use in a wellbore environment according to some examples of the present disclosure. The elastomeric seal 207c can include a core 502 and the shell 504, where the core 502 may be encapsulated by the shell 504. In some examples, the core 502 may include an elastomeric core material with a first modulus, and the shell 504 may include a shell material with a second modulus. The second modulus may be lower than the first modulus to enable the shell material to conform to a surface roughness of a sealing interface.

The core 502 may be partially cured to form the shell 504. The partial curing of the core 502 may be followed by a diffusion-controlled reactive gas or chemical exposure to scavenge any surface peroxides that may not have reacted during the partial curing process. The scavenged surface peroxides may not contribute to cross-linking in the polymer, thereby reducing the modulus of the shell material of the shell 504. In some examples, this can be accomplished by exposing the shell material to an $O_2$-rich post-cure, exposing the material to an acidic chemical treatment, or exposing the shell material to a substance with a sulfur-donating chemistry. The shell material may be exposed to the substance via a coating of the substance on a mold for the shell 504.

In an example, the core 502 may be cured with diffusion limited chemical treatments that can promote polymer reversion to form a shell 504. The polymer reversion process may decrease a molecular weight of the shell 504, thereby decreasing the modulus of the shell material. The shell material may include a halogenated polymer that can exhibit reversion when exposed to Zn-containing compounds. The halogenated polymer can also exhibit a vulcanization sensitivity when exposed to Zn-containing compounds. The vulcanization sensitivity can allow the halogenated polymer to be hardened when treated at high temperatures.

Additionally or alternatively, the shell material may include a fluorinated polymer that can de-fluorinate, thereby liberating hydrogen fluoride and leading to cleavage of a backbone of the polymer. Cleavage of the backbone of the polymer may decrease the modulus of the polymer. Cleavage of the backbone of the polymer may decrease the modulus of the polymer. Alternatively, the shell material may include an unsaturated diene polymer that may exhibit reversion when exposed to persistent high temperatures. In some examples, the shell material may include a low-solubility wax that can bloom to a surface of the shell 404. The low-solubility wax may form the shell 504 or may form part of the shell 404 and may have a lower modulus than the core 502.

Figure 6:
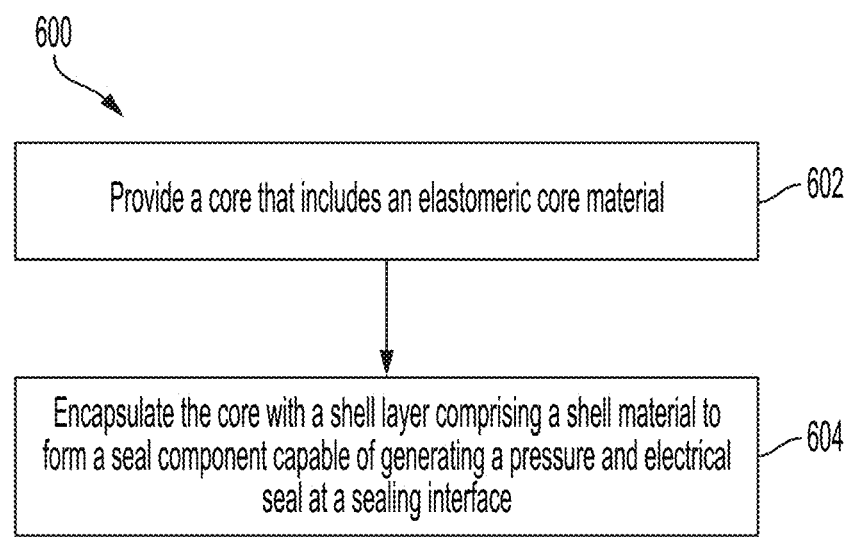
FIG. 6 is a flow chart depicting a method manufacturing the elastomeric seal of FIGS. 4 and 5 according to some examples of the present disclosure.

FIG. 6 is a flow chart depicting a process 600 for manufacturing the elastomeric seal 207 according to some examples of the present disclosure. At block 602, the process 600 includes providing the core 302 that includes an elastomeric core material. The elastomeric core material may have a first modulus and may be made of an elastomer, such as a natural rubber, a styrene-butadiene block copolymer, polyisoprene, polybutadiene, ethylene propylene rubber, ethylene propylene diene rubber, a silicone elastomer, a fluoroelastomer, a polyurethane elastomer, a nitrile rubber, or any combination thereof. The elastomeric core material of the core 302 may include a strength that is sufficient to create a stress-level under deflection to seal while resisting damage under high pressure differentials.

At block 604, the process 600 includes encapsulating the core 302 within a shell 304 including a shell material to form the elastomeric seal 207. The elastomeric seal 207 is able to provide pressure isolation and electrical isolation at a sealing interface. The shell 304 layer may include a shell material with a second modulus that may be lower than the first modulus of the elastomeric core material. The lower modulus of the shell material may enable the shell to conform to a surface roughness at a sealing interface. While the shell 304 is described as encapsulating the core 302, in some examples, the shell 304 can be applied to a single surface of the core 302. For example, the shell 304 can be applied to a surface of the core 302 that provides a sealing interface with another surface.

In some examples, the shell material may include a liquid polymer. The shell 304 can be applied through a surface modification to the elastomeric core material to improve the electrical isolation and pressure isolation at the sealing interface without modifying bulk properties of the core material. In some examples, the shell 304 can be applied to the core 302 by dipping the core 302 into the shell material, co-extruding the core material with the shell material, or enabling the core material to absorb the shell material. Applying the liquid polymer shell 304 to the core 302 may involve blending the liquid polymer with a liquid peroxide that may be the same type of liquid peroxide used in the elastomeric core material. Once blended with the liquid peroxide, the shell material can be co-cured with the elastomeric core material. For applications where the shell 304 is 125 microns or smaller, the liquid polymer can be thinned by solvents until a desired shell 304 thickness is achieved. The liquid polymer may include polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

In some examples, the core 302 may be partially cured to form a shell 304. The partial curing of the core 302 may be followed by a diffusion-controlled reactive gas or chemical exposure to scavenge any surface peroxides that may not have reacted during the partial curing process. The scavenged surface peroxides may not contribute to cross-linking in the liquid polymer, thereby reducing the modulus of the shell 304. In some examples, this can be accomplished by exposing the shell material to an $O_2$-rich post-cure, exposing the shell material to an acidic chemical treatment, or exposing the shell material to a substance with a sulfur-donating chemistry. The shell material may be exposed to the substance via a coating of the substance on a mold for the shell 304.

The core 302 may be cured with diffusion limited chemical treatments to form the shell 304. The diffusion limited chemical treatments can promote polymer reversion. The polymer reversion process may decrease a molecular weight of the shell material, thereby decreasing the modulus of the shell material. The shell material may include a halogenated polymer that can exhibit reversion when exposed to Zn-containing compounds. The halogenated polymer can also exhibit a vulcanization sensitivity when exposed to Zn-containing compounds. The vulcanization sensitivity can allow the halogenated polymer to be hardened when treated at high temperatures. Additionally or alternatively, the shell material may include a fluorinated polymer that can de-fluorinate, thereby liberating hydrogen fluoride and leading to cleavage of a backbone of the polymer. Cleavage of the backbone of the polymer may decrease the modulus of the polymer. Cleavage of the backbone of the polymer may decrease the modulus of the polymer. Alternatively, the shell material may include an unsaturated diene polymer that may exhibit reversion when exposed to persistent high temperatures.

In some examples, the shell material may be 50 microns or less in thickness. The thickness of the shell material may be tuned to match a surface finish of a material at the sealing interface to which the seal is to be applied. In some examples, the shell material may include a low-solubility wax that can bloom to a surface of the shell. The low-solubility wax may form the shell 304, and may have a lower modulus than the core 302.

In some aspects, systems, methods, and assemblies for improving electrical isolation and pressure isolation at a sealing interface are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a seal for use within a hydrocarbon environment comprising: a core comprising an elastomeric core material with a first modulus; and a shell coupled to the core and comprising a shell material with a second modulus that is lower than the first modulus, the core and the shell being positionable to generate a pressure and electrical seal at a sealing interface.

Example 2 is the seal of example 1, wherein the shell material comprises a liquid polymer material that is co-cured with the elastomeric core material.

Example 3 is the seal of example 2, wherein the liquid polymer material comprises at least one of: polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

Example 4 is the seal of examples 1-3, wherein the shell material comprises a low-solubility wax.

Example 5 is the seal of examples 1-4, wherein the shell comprises a thickness of 50 microns or less.

Example 6 is a method comprising: providing a core that includes an elastomeric core material with a first modulus; and encapsulating the core within a shell layer comprising a shell material with a second modulus less than the first modulus to form a seal component capable of generating a pressure and electrical seal at a sealing interface.

Example 7 is the method of example 6, further comprising: co-curing the shell material with the elastomeric core material.

Example 8 is the method of example 7, wherein co-curing the shell material and the elastomeric core material is performed using a peroxide.

Example 9 is the method of example 8, further comprising: applying a peroxide-scavenging fluid to the shell material upon completion of co-curing the shell material and the elastomeric core material, wherein the peroxide-scavenging fluid includes at least one of: a sulfur-donating chemistry, an oxygen-donating chemistry, a hydrogen-donating chemistry, or any combination thereof.

Example 10 is the method of examples 6-9, wherein encapsulating the core with the shell layer to form the seal component comprises submerging the core in a bath of the shell material or applying the shell material to a mold.

Example 11 is the method of examples 6-10, further comprising: thinning the shell material to a desired thickness with a solvent.

Example 12 is the method of examples 6-11, wherein the shell layer has a thickness of 50 microns or less.

Example 13 is the method of examples 6-12, wherein the shell material comprises a low-solubility wax.

Example 14 is the method of examples 6-13, wherein encapsulating the core within the shell layer to form the seal component includes co-extruding the core with the shell layer.

Example 15 is the method of examples 6-14, wherein the shell material is susceptible to volumetric swelling and softening when in contact with a fluid.

Example 16 is the method of examples 6-15, further comprising: positioning the seal component on a wet-stab connector such that the wet-stab connector provides the pressure and electrical seal at the sealing interface during operation of the stab connector.

Example 17 is a wet-stab connector assembly comprising: a male portion; a female portion positionable to receive the male portion to form an electrical connection with the male portion; and an elastomeric seal positionable to provide a pressure and electrical seal at a meeting area of the male portion and the female portion, the elastomeric seal comprising: a core comprising an elastomeric core material with a first modulus; and a shell encapsulating the core and comprising a shell material with a second modulus that is lesser than the first modulus.

Example 18 is the wet-stab connector assembly of example 17, wherein the shell material comprises at least one of: polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

Example 19 is the wet-stab connector assembly of examples 17-18, wherein the shell material comprises a liquid polymer material that is co-cured with the elastomeric core material.

Example 20 is the wet-stab connector assembly of examples 17-19, wherein the shell material is susceptible to volumetric swelling when in contact with a fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A seal for use within a wellbore comprising:
   a core comprising an elastomeric core material with a first modulus; and
   a shell coupled to the core and comprising a shell material co-cured with the elastomeric core material, the shell material having a second modulus that is lower than the first modulus, the core and the shell being positionable to generate a pressure and electrical seal at a sealing interface.

2. The seal of claim 1, wherein the shell material comprises a low-solubility wax.

3. The seal of claim 1, wherein the shell comprises a thickness of 50 microns or less.

4. The seal of claim 1, wherein the shell material comprises a liquid polymer material.

5. The seal of claim 4, wherein the liquid polymer material comprises at least one of: polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

6. A method comprising:
   providing a core that includes an elastomeric core material with a first modulus;
   encapsulating the core within a shell layer comprising a shell material with a second modulus less than the first modulus to form a seal component capable of generating a pressure and electrical seal at a sealing interface; and
   co-curing the shell material with the elastomeric core material.

7. The method of claim 6, wherein encapsulating the core with the shell layer to form the seal component comprises submerging the core in a bath of the shell material or applying the shell material to a mold.

8. The method of claim 6, further comprising:
   thinning the shell material to a desired thickness with a solvent.

9. The method of claim 6, wherein the shell layer has a thickness of 50 microns or less.

10. The method of claim 6, wherein the shell material comprises a low-solubility wax.

11. The method of claim 6, wherein encapsulating the core within the shell layer to form the seal component includes co-extruding the core with the shell layer.

12. The method of claim 6, wherein the shell material is susceptible to volumetric swelling and softening when in contact with a fluid.

13. The method of claim 6, further comprising:
   positioning the seal component on a wet-stab connector such that the wet-stab connector provides the pressure and electrical seal at the sealing interface during operation of the stab connector.

14. The method of claim 6, wherein co-curing the shell material and the elastomeric core material is performed using a peroxide.

15. The method of claim 14, further comprising:
   applying a peroxide-scavenging fluid to the shell material upon completion of co-curing the shell material and the elastomeric core material, wherein the peroxide-scavenging fluid includes at least one of: a sulfur-donating chemistry, an oxygen-donating chemistry, a hydrogen-donating chemistry, or any combination thereof.

16. A wet-stab connector assembly comprising:
   a male portion;
   a female portion positionable to receive the male portion to form an electrical connection with the male portion; and
   an elastomeric seal positionable to provide a pressure and electrical seal at a meeting area of the male portion and the female portion, the elastomeric seal comprising:
      a core comprising an elastomeric core material with a first modulus; and
      a shell encapsulating the core and comprising a shell material with a second modulus that is lesser than the first modulus.

17. The wet-stab connector assembly of claim 16, wherein the shell material comprises at least one of: polybutadiene, polyisoprene, ethylene propylene diene monomer rubber, polyvinyl siloxane, vinyl siloxane, reprosil, epoxy, polyurethane, acrylonitrile butadiene rubber, nitrile rubber vinyl, or any combination thereof.

18. The wet-stab connector assembly of claim 16, wherein the shell material comprises a liquid polymer material that is co-cured with the elastomeric core material.

19. The wet-stab connector assembly of claim 16, wherein the shell material is susceptible to volumetric swelling when in contact with a fluid.

* * * * *